Figure 1:
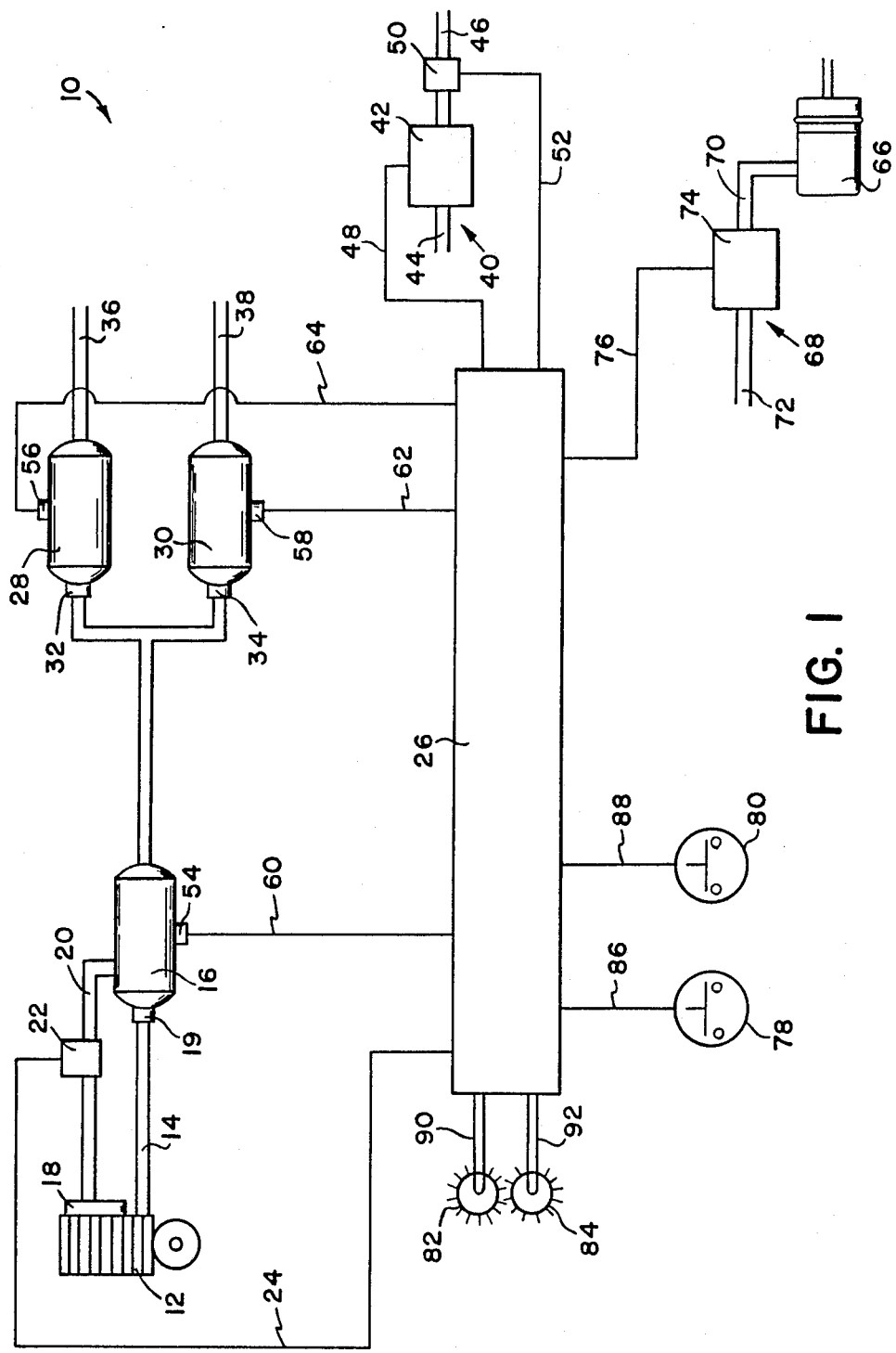

United States Patent [19]

Vandemotter

[11] Patent Number: 4,763,959
[45] Date of Patent: Aug. 16, 1988

[54] ELECTRONIC CONTROL FOR FLUID PRESSURE BRAKING SYSTEM

[75] Inventor: Patrick J. Vandemotter, Westlake, Ohio

[73] Assignee: Allied-Signal Inc., Morristown, N.J.

[21] Appl. No.: 111,905

[22] Filed: Oct. 23, 1987

[51] Int. Cl.⁴ .............................................. B60T 13/68
[52] U.S. Cl. ........................................... 303/9; 303/7; 303/63
[58] Field of Search ......................... 303/3, 6 M, 7-11, 303/13, 15, 16, 20, 29, 30, 63, DIG. 1-3

[56] References Cited

U.S. PATENT DOCUMENTS

| | | | |
|---|---|---|---|
| 3,840,276 | 10/1974 | Jubenville | 303/20 |
| 3,981,542 | 9/1976 | Abrams et al. | 303/20 |
| 4,005,313 | 1/1977 | Tibbits . | |
| 4,127,855 | 11/1978 | Toner . | |
| 4,258,958 | 3/1981 | Bloxham | 303/6 A |
| 4,332,517 | 6/1982 | Igarashi et al. . | |
| 4,358,163 | 11/1982 | Young | 303/22 R |
| 4,402,478 | 9/1983 | Martin . | |
| 4,412,592 | 11/1983 | Bergman et al. . | |
| 4,468,739 | 8/1984 | Woods et al. . | |
| 4,476,954 | 10/1984 | Johnson et al. . | |
| 4,478,459 | 10/1984 | Cumming | 303/7 |
| 4,520,443 | 5/1985 | Yuki et al. . | |
| 4,550,953 | 11/1985 | Bartholomew | 303/15 |
| 4,568,129 | 2/1986 | Stumpe | 303/7 |
| 4,616,881 | 10/1986 | Müller et al. | 303/7 |
| 4,671,578 | 6/1987 | Rothen | 303/15 |

Primary Examiner—Duane A. Reger
Attorney, Agent, or Firm—Ken C. Decker; William N. Antonis

[57] ABSTRACT

A fluid pressure braking system includes pressure sensors in each of the supply and service reservoirs and in the supply line to the trailer. The system includes an air compressor which is loaded and unloaded in response to variations in the pressure level in the supply reservoir by actuation of a solenoid valve by an electronic control module which is responsive to the pressure sensors. The system includes spring brakes which are controlled by the control module through actuation of solenoid valves. The control module is similarly responsive to supply line pressure and the pressure level in the supply line to control a solenoid valve which controls communication through the supply line.

20 Claims, 3 Drawing Sheets

ELECTRONIC CONTROL FOR FLUID PRESSURE BRAKING SYSTEM

This invention relates to a control system for controlling the compressor unloader and parking brakes of a vehicle equipped with fluid pressure operated brakes.

Heavy duty vehicles are equipped with a braking system which is actuated by compressed air. The compressed air is produced by an air compressor operated by the vehicle engine. The air compressor charges storage reservoirs, and is unloaded by a pneumatically operated valve or governor which is responsive to the pressure level in the reservoirs. This system includes a parking brake subsystem in which spring-applied, fluid pressure released parking brakes are controlled by pneumatic valves mounted in the dashboard of the vehicle so they are accessible to the vehicle operator. Of course, a number of pneumatic connections must be made underneath the dashboard, which are quite difficult and expensive to install when the vehicle is assembled and even more expensive to repair when the vehicle is maintained. The various valves and other pneumatic controls are inherently less accurate and slower than more modern electronic sensors and valves.

Accordingly, the main advantage of the present invention is that the pneumatic connections in the vehicle operator's compartment heretofore necessary are replaced by electrical switches and wires, thereby not only simplifying installation and maintenance, but also resulting in a much smaller package. Furthermore, the electronic control system disclosed herein is inherently more accurate and reacts more quickly than do existing pneumatic control systems. A prior art system, which uses relays instead of the programmable control module, is disclosed in U.S. Pat. No. 4,550,953 (Bartholomew).

Figure 2:
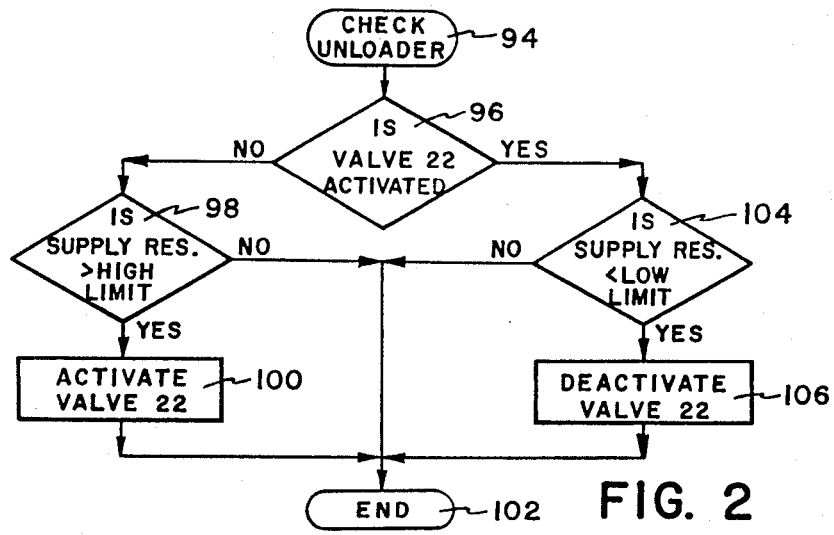
Figure 3:
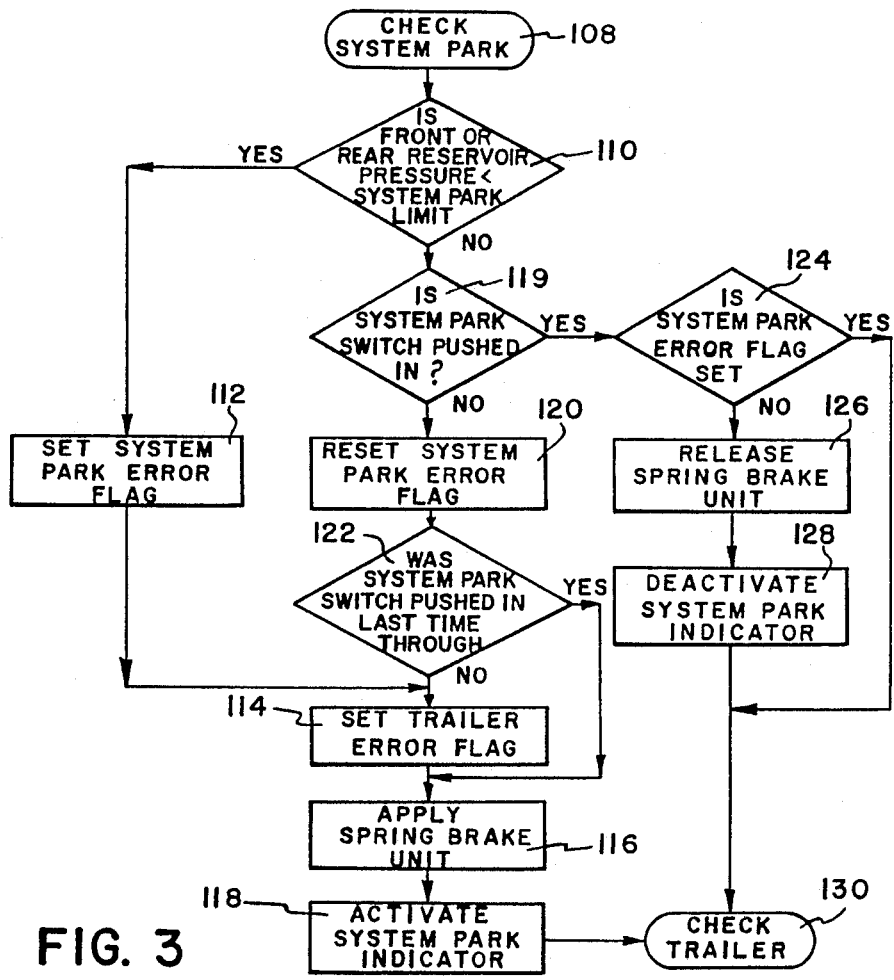
Figure 4:
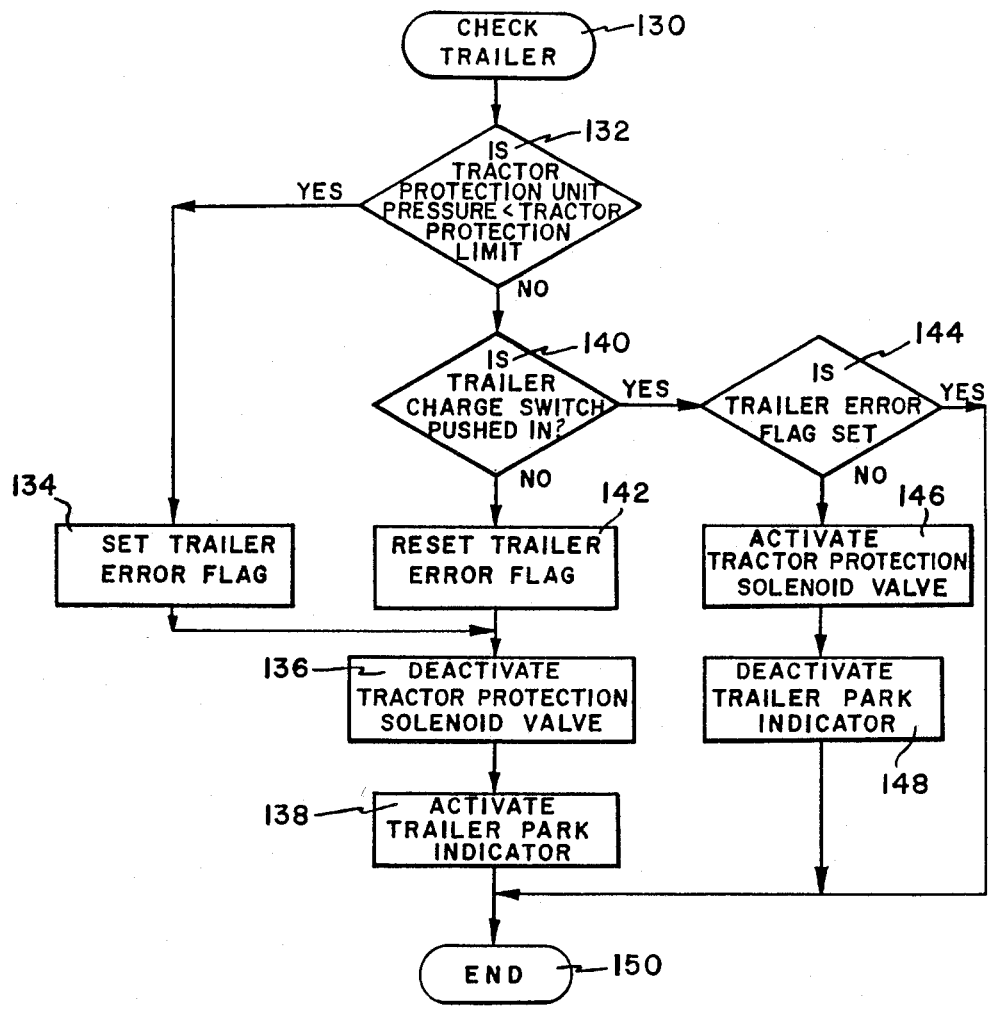

These and other advantages of the present invention will become apparent from the following description with reference to the accompanying drawings in which:

FIG. 1 is a partial schematic of a fluid pressure braking system with an electronic control device pursuant to the teachings of the present invention; and FIG. 2, FIG. 3, and FIG. 4 are detailed block system diagrams illustrating the way in which the electronic control module illustrated in FIG. 1 is programmed.

Referring now to the drawings, a fluid pressure braking system generally indicated by the numeral 10 includes an air compressor 12 which is powered by the vehicle engine (not shown). The outlet of the compressor communicates with a discharge line 14 which communicates compressed air from the air compressor 12 to a supply reservoir 16 through a pressure protection valve 19. The pressure protection valve 19 is conventional, and closes to prevent escape of air from the air compressor 16 when the pressure in supply line 14 drops below a predetermined level. Compressor 12 includes a unloader mechanism 18 which unloads the compressor 12 in response to a pressure signal communicated through pressure line 20. An electrically actuated solenoid valve 22 is installed in the line 20. The valve 22 is responsive to a signal transmitted on electrical line 24 to shift from a first position communicating the unloader 18 with the supply reservoir 16 to a second position in which communication between the unloader 18 and the supply reservoir 16 is interrupted and the portion of the conduit 20 communicating with the unloader 18 is vented to atmosphere. The line 24 is connected to an appropriate terminal on a microprocessor based electronic control module generally indicated by the numeral 26.

The supply reservoir 16 is communicated with front and rear service reservoirs 28, 30 through conventional pressure protection valves 32, 34 which are similar to the pressure protection valve 19. Conduits 36, 38 communicate the front and rear supply reservoirs 28, 30 to the ports of a dual brake valve (not shown) for actuation of the vehicle's service brake system, and, through a double check valve (not shown) to a supply line generally indicated by the numeral 40. Supply line 40 connects with the braking system on the trailer portion of the vehicle to communicate fluid pressure from the tractor to the trailer and to control the parking/emergency brakes on the trailer. Communication through the supply line 40 is controlled by an electrically actuated solenoid valve 42. The solenoid valve 42, which divides the supply line 40 into an upstream portion 44 which is communicated with the tractor braking system and a downstream portion 46 which is communicated to the trailer braking system. Valve 42 is actuatable from a first condition which communicates the portions 44, 46 of the supply line 40 with one another, to a second condition which closes communication between the portions 44, 46 and vents the portion 46 to atmosphere. The solenoid of solenoid valve 42 is connected to an appropriate output terminal of the electronic control module 46 through a control line 48. A pressure transducer 50 is connected in the downstream portion 46 of supply line 40. Transducer 50 generates a signal which varies as a function of the pressure level in portion 46, which is transmitted to the control module 26 on transmission line 52. Similar pressure transducers 54, 56, and 58 generate signals which vary as a function of the pressure levels in the reservoir 16, 28, and 30 respectively. The signals transmitted by transducers 54, 56, and 58 are transmitted to the appropriate input terminals of electronic control module 26 over lines 60, 62, and 64.

The tractor portion of the vehicle upon which the system 10 is mounted is equipped with spring-applied, fluid pressure released parking brakes generally indicated by the numeral 66. Fluid pressure is communicated to supply hold-off pressure to the spring brakes 66 through a conduit generally indicated by the numeral 68, which is separated into a downstream section 70 which communicates with the brakes 66 and an upstream portion 72 which communicates with the remainder of the vehicle braking system and ultimately to the supply reservoir 16. A solenoid actuated electronic control valve generally indicated by the numeral 74 controls communication between sections 70 and 72 of conduit 68. Valve 74 is shiftable from a first condition which communicates the upstream and downstream portion 70, 72 of the conduit 68 with one another, to a second portion which terminates communication between the upstream and downstream portion 70, 72 and vents the downstream portion 70 to atmosphere. A signal is transmitted to the solenoid actuator of the solenoid valve 74 through a line 76 which connects the solenoid to the electronic control module 26.

System 10 further includes a pair of substantially identical, industrial grade, push/pull switches 78, 80. These switches are operated by the vehicle operator, and are capable of being manually pushed in and manually pulled out. Once the switches 78, 80 are pushed in, they remain in this condition until they are manually pulled out by the vehicle operator. Switches 78, 80 are conventional. Switch 78 controls the parking/emergency brakes on both the tractor and trailer and hereinafter referred to as the system park switch. The switch 80 controls the brakes only on the trailer, and is hereinafter referred to as the trailer park switch. The system 10 includes a system park indicator 82, which is actuated by the control module 26 whenever the parking/emergency brakes on both the tractor and trailer are applied which, as will hereinafter be apparent, can occur regardless of the position of the system park switch 78. Similarly, an indicator 84, hereinafter referred to as the trailer indicator, is actuated whenever the brakes of the trailer are applied, regardless of the position of the trailer park switch 80. Switches 78, 80 and indicators 82, 84 are connected to the control module 26 through lines 86, 88, 90 and 92 respectively.

Referring now to FIG. 2, the operation and programming of the microprocessor contained within the electronic control module 26 will be described in detail. The microprocessor included within control module 26 is programmed to continually monitor the pressure sensor 54 and the condition of the valve 22, to thereby control the governor 18. The program is started by checking the unloader as the check unloader function as indicated at 94 of FIG. 2. The condition of valve 22 is checked, to determine if the valve is either activated or deactivated. This is indicated in block 96 of FIG. 2. If the valve 22 is not activated, that is, the compressor is presently active and charging the reservoir 16, the program proceeds to decision block 98, which determines if the pressure level in the supply reservoir 16, as measured by the pressure sensor 54, is above a predetermined high limit set in the software of the microprocessor. If the pressure in supply reservoir 16 is above the high limit, the valve 22 is actuated, as indicated at 100 in FIG. 2. Accordingly, a pressure signal is transmitted to the unloader 18, to thereby unload the compressor, and terminate charging of the supply reservoir 16. If decision block 98 determines that the supply reservoir is not above the high limit, the program merely ends as indicated at 102, and the compressor continues to charge the reservoir 16. If it is determined that the valve 22 is activated as indicated at block 96, the pressure level in the supply reservoir 16 is then tested to see if it is below the low limit, as indicated at 104. If the supply reservoir pressure is below the low limit, the valve 22 is deactuated, that is, the signal which was theretofor transmitted to the governor 18 unloading the compressor is then vented. If, as tested at 104, the supply reservoir is not less than the low limit, the program merely ends as indicated at 102. Accordingly, the pressure level in the supply reservoir 16 is monitored. As long as the pressure level is within the deadband between the high and low limits, no action is taken to change the status of the unloader 18, but if the pressure level is above the high limit while the compressor is loaded or below the low limit if the compressor is unloaded, the state of the governor 18 is switched, to thereby maintain the pressure level in the supply reservoir 16 as close to the pressure between the two limits as possible.

Control of the vehicle parking/emergency brakes will now be described with reference to FIGS. 3 and 4. The parking brakes, such as the parking brake 66, on both the tractor and trailer are preferably actuated by a spring actuator which is held off to release the brake by fluid pressure. In that way, in case of loss of pressure in the system, the spring brakes automatically apply. Similarly, when the vehicle is parked, the hold-off pressure in the spring brakes is vented, thereby permitting the spring actuator to apply the brakes while the vehicle is parked.

When the vehicle operator desires to move the vehicle, he first starts the vehicle engine, thereby causing the air compressor 12 to charge the reservoir 16, 28, and 30. When the reservoirs are charged, the vehicle operator pushes in both the system park switch 78 and trailer park switch 80. As will hereinafter be described, the pushing in of switches 78, 80 causes fluid pressure to communicate to the parking actuator 66 on the tractor and to the parking actuators on the trailer through the supply line 40. Of course, before the switches are pushed in, the indicator lights 82, 84 are on, indicating a parked condition. If the system is operating normally when the switches 78, 80 are pushed in, fluid pressure is communicated to the parking/ emergency brakes 66 on the tractor and to the trailer parking/emergency brakes through the supply line 40. However, as will be hereinafter explained, in case of loss of pressure in the system, the parking/emergency brakes will apply even though the switches 78, 80 remain pushed in.

However, when the parking/emergency brakes are applied during loss of pressure in the system, the indicator lights 82 and 84 go on, thereby indicating to the vehicle operator that the spring brakes have been applied, even though the switches 78, 80 have been pushed in. The operator may then try to release the brakes, since the loss of pressure may be a transient phenomena. Accordingly, the vehicle operator must then pull out the switches 78, 80, and then push them back in. If the system pressure has returned to normal, the indicators 82, 84 will remain off, indicating that the vehicle is operable. However, if a low pressure condition remains, the indicator 82 and 84 will remain on.

The microprocessor which is a component of electronic control module 26 cycles through the programs illustrated in FIGS. 3 and 4 continuously to monitor the status of the switches 78, 80 and the pressure sensors 50, 56, and 58 as will be hereinafter described. The system park subroutine is started as indicated at 108 in FIG. 3. The pressure sensors 56, 58 are then tested as indicated at 110. If either of the pressure sensors 56, 58 indicates a low pressure condition, a system malfunction is indicated, and the program sets a system park error flag as indicated at 112. A trailer error flag is set as indicated at 114. This flag is used in the program illustrated in FIG. 4, since the trailer brakes are automatically applied if a malfunction in the tractor system causes an application of the tractor parking brakes. The brakes 66 are then applied, as indicated at 116, and the system park indicator 82 is then actuated as indicated at 118. It should be noted that the test made at 110 in FIG. 3 is made regardless of the condition of the switches 78, 80.

If the pressure level in the reservoirs 28, 30 is above the system low limit as tested at 110, the program then determines if the system park switch 78 has been pushed in, as indicated at 119. As discussed above, the system park switch 78 will be pushed in when the operator desires to release the spring brakes 66 and move the vehicle. If the system park switch has not been pushed in, indicating that the vehicle is to remain parked, the system park error flag is reset, as indicated at 120.

The condition of the various switches is stored in the memory of the electronic control module 26 for one additional pass or cycle through the program. Accordingly, as indicated at 122, the condition of the system park switch the last time the cycle was made through the program is tested. If the system park switch was pushed in on the previous cycle, block 114, which sets the trailer error flag, is bypassed, so that the trailer brakes may be released even if brakes are desired on the tractor system. Of course, on the previous cycle through the program, the trailer error flag was set in order to effect an automatic application of the trailer brakes in response to the application of the tractor spring brake unit. The program then continues through blocks 116 and 118 to apply the spring brakes and activate the system park indicator.

Referring back to decision block 119, if the system park switch is pushed in, the system park error flag is tested as indicated at 124. If the system park error flag is not set, the spring brakes 66 are released as indicated at 126 and the system park indicator 84 is deactuated as indicated at 128. If the system park error flag is set as tested at 124, the blocks 126 and 128 are bypassed, so that the spring brakes remain applied and the system park indicator remains actuated. Accordingly, the spring brakes will not automatically released after they have been applied during a transient loss of pressure in the system, since the vehicle operator must pull out the system park switch and then push it back in, to enable the system park error flag to be reset as indicated at 120. If system pressure recovers, the vehicle operator may release the spring brakes by pulling out and then pushing in the system park switch, but this action of the vehicle operator is required as a safety feature to prevent an automatic release of the spring brakes upon recover from a transient loss of system pressure. The trailer system is then automatically checked as indicated at 130 in FIGS. 3 and 4.

Referring to FIG. 4, the trailer park subroutine is started as indicated at 130. The pressure sensor 50 downstream of the tractor protection solenoid valve 42 is tested to determine if the pressure in the portion 46 of the supply line 40 is less than a predetermined tractor protection limit. This test is made as indicated at 132 in FIG. 4. If the pressure sensed by sensor 50 is less than the tractor protection limit, a trailer error flag is set as indicated at 134 and the tractor protection solenoid valve 42 is deactivated as indicated at 136. When the tractor protection solenoid valve 42 is deactivated, communication between the portions 44 and 46 is terminated, and the portion 46 of supply line 40 is vented. The trailer park indicator 84 is then activated, as indicated at 138 in FIG. 4. The subroutine then ends as indicated at 140.

If the pressure sensed by pressure sensor 50 is above the predetermined tractor protection limit, the subroutine proceeds from decision block 132 to decision block 140, which determines if the trailer charge switch 80 is pushed in. If the switch is not pushed in, the trailer error flag is, if necessary, reset as indicated at 142. Accordingly, as in the case of the tractor charging system, if a transient loss of pressure in the supply line has caused actuation of the valve 42, the vehicle operator is required to first pull out the switch and then push it back in in order to reset the trailer error flag and to be able to activate the tractor protection solenoid valve 42, as will hereinafter be described. This is accomplished in decision block 144, which tests the trailer error flag. Decision block 144 is reached from decision block 140, which tests the trailer charge switch. If the trailer charge switch has been pushed in, the trailer error flag is tested in block 144. If the trailer error flag has been set, the subroutine branches to the end 140. Accordingly, the vehicle operator is required to pull out and push in the trailer charge switch 140 in order to reset the trailer error flag at 142 in the case that a transient pressure loss in the supply line has caused deactivation of the tractor protection solenoid valve 42.

If the trailer error flag has not been set, the subroutine activates the tractor protection solenoid valve 42, as indicated at 146. Again, when the tractor protection solenoid valve 42 is activated, the portions of 44 and 46 of the supply line 40 are connected to one another and, accordingly, fluid pressure is permitted to communicate to the trailer braking system. The trailer park indicator 84 is then deactivated, as indicated at 148. The subroutine then ends as indicated at 140.

I claim:

1. Fluid pressure braking system comprising a compressor, reservoir means for storing fluid pressure generated by said fluid pressure source, conduit means for communicating with said fluid pressure source, pressure sensing means in said reservoir means for generating an electrical signal which varies a function of the pressure level in said reservoir means, compressor disabling mechanism communicating with the reservoir means for unloading the compressor, electrically operated valve means for controlling communication of a pressure signal between the reservoir means and the disabling mechanism, said electrically operated valve means being shiftable from a first condition communicating the disabling mechanism with said reservoir means to a second condition closing communication between said reservoir means and venting said disabling mechanism to atmosphere, and control means for comparing said electrical signal with a high and low pressure limit, said control means generating a control signal shifting said electrically operated valve means to actuate said disabling mechanism to unload said compressor when said pressure level in said reservoir means is above said high level and shifting said electrically operated valve means to cause said compressor to charge said reservoir when the pressure level in said reservoir means is below said low limit.

2. Fluid pressure braking system as claimed in claim 1, wherein said braking system includes mechanically applied, fluid pressure released brakes, and electrically actuated valve devices for controlling communication of fluid pressure to said brakes, said control means including means responsive to said pressure signals for generating a control signal operating said valve devices to control communication of fluid pressure to said brakes.

3. Fluid pressure braking system as claimed in claim 2, wherein said braking system includes operator actuated switch means for controlling communication to said brakes, said control means being responsive to said switch means for generating a control signal operating said valve devices to apply said brakes if the switch means is in a first position and releasing said brakes if the switch is moved to a second position.

4. Fluid pressure braking system comprising a compressor, reservoir means for storing fluid pressure generated by said fluid pressure source, conduit means for communicating with said fluid pressure source, pressure sensing means in said reservoir means for generating an electrical signal which varies a function of the pressure level in said reservoir means, said braking system including mechanically applied, fluid pressure released brakes, and electrically actuated valve devices for controlling communication of fluid pressure to said brakes, said control means including means responsive to said pressure signals for generating a control signal operating said valve devices to control communication of fluid pressure to said brakes, said braking system including operator actuated switch means for controlling communication to said brakes, said control means being responsive to said switch means for generating a control signal operating said valve devices to apply said brakes if the switch means is in a first position and releasing said brakes if the switch is moved to a second position, said control means including switch resporsive means cooperating with the means responsive to said pressure signals to generate said control signal operating said valve devices to apply said brakes if either the switch means is moved to the first position or the value of the pressure signals indicate a low pressure condition.

5. Fluid pressure braking system as claimed in claim 4, wherein said control means includes means preventing generation of a control signal operating said valve devices to release said brakes if said brakes have been applied in response to a pressure signal indicating a low pressure condition until said switch means has been moved from said first position to said second position and then back to said first position.

6. Fluid pressure braking system as claimed in claim 5, wherein said braking system includes indicator means actuated in response to the control signal applying said brakes to advise the vehicle operator that the brakes have been applied.

7. Fluid pressure braking system as claimed in claim 4, wherein said reservoir means includes a pair of service reservoirs, said pressure sensing means including a pressure sensor for each of said reservoirs generating first and second pressure signals responsive respectively to the pressure levels in each of said reservoirs, said control means generating said control signal applying said brakes in response to a low pressure condition in either of said reservoirs.

8. Fluid pressure braking system as claimed in claim 7, wherein said reservoir means includes a supply reservoir communicated to said pressure source and to each of said service reservoirs, said pressure sensing means including a pressure sensor responsive to the pressure level in said supply reservoir for generating a supply reservoir pressure signal, said control means being responsive to said supply reservoir pressure signal for controlling said electrically operated valve means in response thereto.

9. Fluid pressure braking system as claimed in claim 4, wherein said braking system includes a supply line for communicating fluid pressure, a pressure responsive device in said supply line for generating a supply line pressure signal, and electrically controlled valve means for controlling communication through said supply line, said control means being further responsive to said supply line pressure signal for actuating said electrically controlled valve means to terminate communication through said supply line if the pressure level in the supply line drops below a predetermined pressure level.

10. Fluid pressure braking system comprising a source of fluid pressure, reservoir means for storing fluid pressure generated by said fluid pressure source, pressure sensing means for generating a pressure sensing signal which varies as a function of the pressure level in the reservoir means, mechanically applied, fluid pressure released brakes adapted to be communicated to said reservoir means when the brakes are to be released, electrically actuated valve means for controlling communication of fluid pressure from said reservoir means to said brakes, operator actuated electrical switch means for controlling said valve means, said switch means being actuatable from a first position releasing said brakes to a second position applying said brakes, and control means responsive to said pressure sensing signal and to said switch means for generating an electrical control signal causing said valve means to release said brakes when the fluid pressure level in said reservoir means is above a predetermined level and said switch means is in said first position, and causing said valve means to apply said brakes if said pressure level in said reservoir means drops below said predetermined level and said switch means is in either position or said switch means is actuated to said second condition.

11. Fluid pressure braking system as claimed in claim 10, wherein said control means includes means preventing said valve means from releasing said brakes if said brakes have been applied in response to a pressure sensing signal indicating a low pressure condition in said reservoir means until said switch means has been moved from said first position to said second position and than back to said first position.

12. Fluid pressure braking system as claimed in claim 11, wherein said switch means is a two-position switch that remains in either said first or second position until physically moved to the other position by the vehicle operator, and indicator means responsive to said cortrol signal to advise the vehicle operator that said brakes have been applied.

13. Fluid pressure braking system as claimed in claim 11, wherein said reservoir means includes a pair of isolated service reservoirs, said pressure sensing means including a pressure sensor for each of said reservoirs generating first and second pressure signals responsive respectively to the pressure levels in each of said reservoirs, said control means generating said control signal applying said brakes in response to a low pressure condition in either of said reservoirs.

14. Fluid pressure braking system as claimed in claim 11, wherein said braking system includes a supply line for communicating fluid pressure, a pressure responsive device in said supply line for generating a supply line pressure signal, and electrically controlled valve means for controlling communication through said supply line and for controlling communication between said supply line and atmosphere, said control means including means responsive to said supply line pressure signal for actuating said electrically controlled valve means to close communication through said supply line and vent the latter to atmosphere when the pressure level in the supply line drops below a predetermined level.

15. Fluid pressure braking system as claimed in claim 14, wherein said control means includes means responsive to said pressure sensing signal for actuating said electrically controlled valve means to close communication through said supply line and to vent said supply line to atmosphere when the pressure level in the reservoir means drops below said predetermined level.

16. Fluid pressure braking system as claimed in claim 14, wherein said control means includes means for actuating said electrically controlled valve means to close communication through said supply line and to vent said supply line to atmosphere whenever said brakes are applied.

17. Fluid pressure braking system as claimed in claim 16, wherein said braking system includes an operator actuated switching device, said control means including means responsive to said switching device to control said electrically controlled valve means.

18. Fluid pressure braking system for a combination vehicle including a tractor and a trailer comprising a source of fluid pressure carried by said tractor, reservoir means for storing fluid pressure generated by said fluid pressure source, a supply line for communicating the reservoir means with the trailer, first pressure sensing means for generating a first pressure sensing signal which varies as a function of the pressure level in the reservoir means, electrically actuated valve means for controlling communication through said supply line, second pressure sensing means for generating a second pressure sensing signal which varies as a function of the pressure level in the portion of the supply line between the electrically actuated valve means and the trailer, said electrically actuated valve means being shiftable from a first condition venting said supply line and terminating communication therethrough to a second condition initiating communication through said supply line, an operator actuated electrical switching device actuatable from a first position to a second position to control said valve means, and control means responsive to said pressure signals and to said switching device for generating an electrical signal shifting said valve means to said first condition when either said switching device is in said first position, or said first electrical signal is below a first predetermined level, or said second electrical signal is below a second predetermined level, said microprocessor shifting said valve means to said second condition when the switch means is in the second condition while both said first and second electrical signals are greater than their corresponding first and second levels.

19. Fluid pressure braking system as claimed in claim 18, wherein said control means includes means responsive to said first pressure sensing signal to cause said electrically actuated valve means to shift to said first condition when the pressure level in the reservoir means drops below the predetermined level.

20. Fluid pressure braking system as claimed in claim 19, wherein said switching device is a two-position switch that remains in either position until physically moved to the other position by the vehicle operator, and an indicating device responsive to said electrical signal to advise the vehicle operator that said brakes have been applied.

* * * * *